Feb. 8, 1966     F. BAUR     3,234,491
TRANSDUCER HAVING COIL SECTIONS OF VARYING INSIDE
AND OUTSIDE DIAMETERS
Filed Dec. 4, 1959

INVENTOR.

FRITZ BAUR

BY Horace B. Van Valkenburgh

ATTORNEY

United States Patent Office

3,234,491
Patented Feb. 8, 1966

3,234,491
TRANSDUCER HAVING COIL SECTIONS OF VARYING INSIDE AND OUTSIDE DIAMETER
Fritz Baur, Denver, Colo., assignor to Wm. Ainsworth & Sons, Inc., Denver, Colo., a corporation of Delaware
Filed Dec. 4, 1959, Ser. No. 857,318
7 Claims. (Cl. 336—30)

This invention relates to transducers and more particularly to inductance sensitive transducers.

The novel transducer of this invention is particularly adapted to be utilized in automatic recording balances, but the use of the same is not confined to balances. Thus, a transducer of this invention is useful wherever small movements, normally linear, are to be measured or indicated. As disclosed in the copending application of Gordon S. Clayson, Serial No. 762,647, filed September 22, 1958, now U.S. Patent No. 3,086,603, an inductance sensitive transducer is particularly useful in producing an indicating signal which is proportional to the amount and direction of movement of a movable portion of a balance, such as a beam supported in the center and from one side of which an object to be weighed is suspended and on the opposite side of which weights are applied. In one such balance, automatically switched weights are added or subtracted in 100 mg. increments and the transducer is used to indicate weight differences of 0.1 mg. The conventional transducer comprises a pair of coils of the same diameter and an equal number of turns with the same wire, mounted in axial alignment on a spool, through the center of which moves a probe which is responsive to the position of a moving part, such as a balance beam. In such a balance, for accurate weighing, the linear range over which the probe may move for indicating purposes should produce a signal which is accurate to within 1/10 of one percent of the actual movement of the probe. With the transducer disclosed in the aforesaid application Ser. No. 762,647, such linear range was about 0.04 inch. However, with a transducer of the present invention, such linear range was increased to three times that amount, i.e., to over 0.120 inch.

Among the objects of the present invention are to provide a novel transducer, particularly of the inductance sensitive type; to provide such a transducer which has a greater effective linear range; to provide such a transducer which is particularly adapted for use in analytical balances, but may be used for other purposes and in other types of equipment; and to provide such a transducer which is readily constructed and is reliable in operation.

The foregoing and additional objects of this invention, together with the advantages and novel features thereof, will become apparent from the description which follows, taken in connection with the accompanying drawings, in which.

Figure 1:
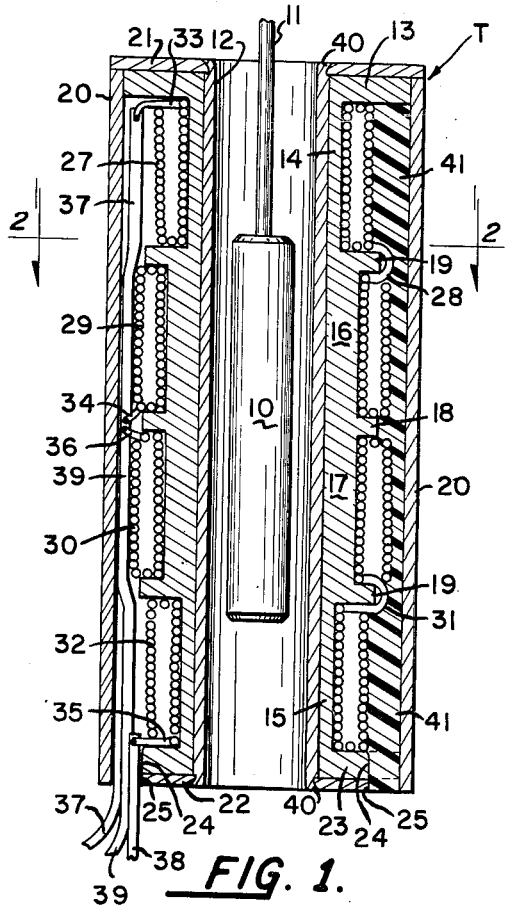
FIG. 1 is a longitudinal section, on an enlarged scale, of a transducer constructed in accordance with this invention.
Figure 2:
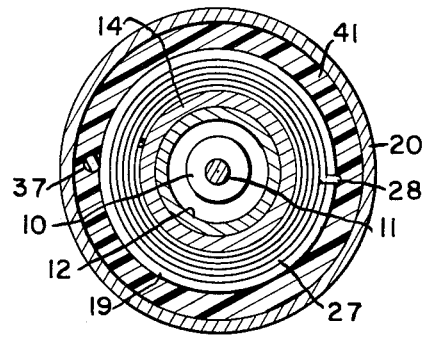
FIG. 2 is a cross section taken along line 2—2 of FIG. 1.
Figure 3:
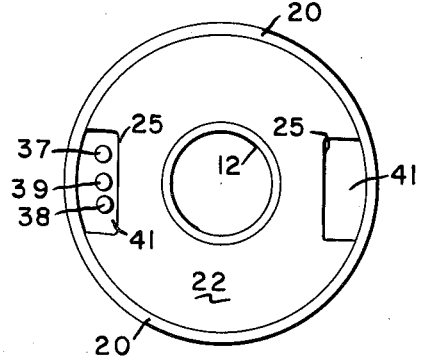
FIG. 3 is an end view of the transducer of FIG. 1.

An inductance sensitive transducer, constructed in accordance with the present invention and as illustrated in FIGS. 1–3, may be provided with a probe 10 supported by a rod 11, by which the probe is moved, as through attachment of rod 11 to a movable portion of a balance. Probe 10 moves axially within an inner cylindrical sleeve 12 surrounded by a spool 13, which, in accordance with the present invention, is provided with cylindrical spaces of different diameters for different portions of the coils, such as surrounding cylindrical wall sections 14 and 15 of lesser thickness, adjacent each end of the spool, and cylindrical wall sections 16 and 17 of greater thickness, disposed in adjacent relation at the center of the spool. A central, outwardly extending flange or rib 18 separates the spaces outwardly of wall sections 16 and 17, while an intermediate, outwardly extending flange or rib 19 separates the spaces disposed outwardly of the wall sections 14 and 16, and 15 and 17, respectively. An outer sleeve 20 surrounds the spool, to hold the coils in place, while an end ring 21 may connect the inner sleeve 12 and outer sleeve 20 at one end of spool 13, with an end ring 22 connecting the opposite ends of the inner and outer sleeves. One end flange 23 of the spool may be provided with oppositely disposed slots 24 and end ring 22 with similar, aligned slots 25, for convenience in extending the leads to the coils to a position exteriorly of the spool, for connection with other electrical parts, as well as to facilitate the construction of the transducer.

In a normal transducer of this type, there are two coils of equal length and also equal inner and outer diameter, wound on a spool with the inner ends of the coils connected together at one lead and the outer ends of the coils forming separate leads. However, in accordance with the present invention, each coil is separated into two radially offset halves, one of greater inner diameter and disposed adjacent the other coil, and another of a lesser inner diameter and disposed opposite the other coil. Thus, a coil section 27 is disposed in the space outwardly from wall section 14, with the outer end 28 thereof extending over rib 19 and into the space outwardly from wall section 16 to a coil section 29, which with coil section 27 forms one coil of the transducer. The opposite coil of the transducer is formed by a coil section 30 disposed in the space surrounding wall section 17 with the end 31 thereof extending over flange 19 and into the space surrounding wall section 15 to a coil section 32, which with coil section 30 forms the other coil of the transducer. Conveniently, each coil is wound from the outer end toward the inner end, such as starting with end 33 for coil section 27 and terminating with end 34 of coil section 29, for one coil; and similarly starting with end 35 of coil section 32 and terminating with end 36 of coil section 30, for the other coil. After the coils have been wound on spool 13, lead wires 37, 38 and 39 may be attached to the ends of the coil wires, as by a soldered joint covered by insulation, such as a suitable tape, as of silk or varnished cambric. Thus, lead 37 is attached to end 33 of one coil and lead 38 to end 35 of the opposite coil, while ends 34 and 36 of the respective coils are brought together and attached to lead 39. The leads 37, 38 and 39 are preferably larger wires than the relatively fine wires of which the coils are usually formed, to facilitate connection of the leads to terminals by which the transducer coils may be connected to other wires and thence to the other parts. In FIG. 1, the coil wire and the lead wire are shown as larger than they would normally be, for clarity of illustration.

After the coils have been wound on spool 13, inner sleeves 12 may be slipped within the spool and outer sleeve 20 over the spool, then end rings 21 and 22 placed in position and each end of the inner sleeve rolled over at 40 onto the respective ring. The outer ends of inner sleeve 12 are also conveniently provided with shoulders, as shown, to facilitate positioning end rings 21 and 22.

The leads 37, 38 and 39 are preferably laid in one pair of aligned slots 24 and 25, as in FIGS. 1 and 3, while the opposite aligned slots 24 and 25 may be used to introduce a suitable insulating material 41, such as an epoxy resin provided with microscopic glass beads in sufficient number to produce an appropriate coefficient of expansion of the resin. A resin known as "Stycast No. 2651" has been found suitable for this purpose. For introduction of the insulating resin, the spool may be reversed from the position shown in FIG. 1, so that the slots 24 and 25 are uppermost, the hole in inner sleeve 12 plugged and a filling bell placed around the outer edges of the then upper end of the spool. An appropriate quantity of heated resin may be poured into the bell, so it will enter through the open slots 24 and 25, as well as around leads 37, 38 and 39. In order to cause the resin to completely fill the space between the coils and the outer sleeve 20, as well as permeate the coils themselves, a vacuum may be drawn on the filling bell, so as to exhaust as much air as possible from within the coil assembly. Then, after the vacuum has been applied for a sufficient period of time to exhaust as much air as is conveniently possible, air pressure may be applied to the bell, so as to force the resin in between the coil wires and also to force the remainder of the resin in the bell down into the spaces between the spool and the sleeve 20. The resin, of course, preferably fills slots 24 and 25, on each side, although resin 41 has not been shown between the wires of the coils or in the spaces at the left in FIG. 1, for clarity of illustration. However, it will be evident from FIG. 2 that the resin completely surrounds the coils and also leads 37, 38 and 39.

Figure 4:
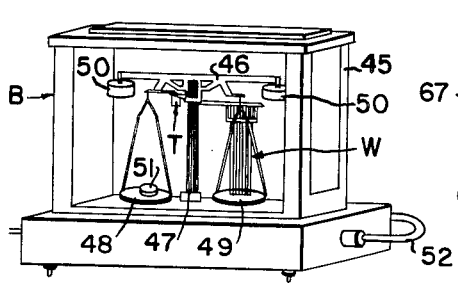
FIG. 4 is a perspective view, on a reduced scale, of a balance with which the transducer of this invention may be used.
Figure 5:
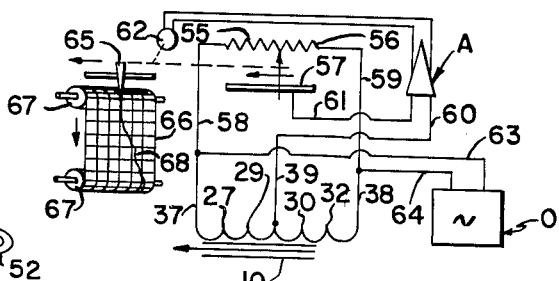
FIG. 5 is a diagrammatic representation of a number of the elements which may be used with the transducer and the balance of FIG. 4.

A transducer T, constructed as described above, may be used in the balance B of FIG. 4, conveniently when in the position of FIG. 1, i.e., with leads 37, 38 and 39 extending from the lower end of the stationary portion of the transducer, which is mounted on a stationary part of the balance, as in the manner disclosed in the aforesaid application Ser. No. 762,647, to facilitate the connection of other wires or parts thereto. This use of a transducer of this invention produced completely unexpected and unpredictable results, in connection with a recording balance, such as the "Ainsworth" BR analytical balance. Such a balance, as in FIG. 4, includes a conventional case 45 provided with transparent wall sections which permit observation of the balance in operation and which encloses the operating parts and protects the same from air currents and the like. In general, such parts include a beam 46 pivoted on an upright support 47, as by a knife-edge bearing, with pans 48 and 49 suspended from opposite ends of beam 46, again conveniently by knife-edge bearings, while an extension at each end of the beam may be connected to the piston of the respective air-dash pot 50 for damping purposes. A weight 51, if necessary, may be placed on one pan 48 and the object to be weighed on pan 49, although normally the object to be weighed will be placed on pan 48, while a series of weights are placed automatically on pan 49 or suspended from that end of the beam, by an automatic weight applying mechanism W, which may be operated by suitable mechanism in the base of case 45. The weight switching mechanism includes weights suspended by the mechanism and automatically moved by cams and a motor under the balance floor. A cord 55 connects the balance with a recorder, such as the "Ainsworth" type AU1 recorder, not shown in FIG. 4, but certain of the operating parts thereof being shown in FIG. 5. The principal elements of the balance and recorder are shown in FIG. 5, reference being made to the aforesaid application Ser. No. 762,647 for greater details of the circuit. In general, coil 27, 29 and coil 30, 32 comprise two legs of a bridge circuit with the resistance portions 55 and 56 of a slide wire potentiometer 57 forming the other two legs of the bridge, leads 37 and 38 from the outer ends of the coils being connected respectively to the opposite ends of the resistances 55 and 56, through wires 58 and 59, respectively. Lead 39 from the common connection between the transducer coils is connected by a wire 60 to one input terminal of an amplifier A, while the slide wire of potentiometer 57 is connected by a wire 61 to the other input terminal of amplifier A, the output of which feeds a servo motor 62 which controls the position of the slide wire potentiometer 57. The bridge circuit is energized by means of an oscillator O, which generates a high frequency alternating current, such as on the order of 3 to 15 kilocycles and conveniently between 6 and 10 kilocycles. The voltage need be only a few volts, such as from 0.3 to 5 volts and conveniently about 3 volts. The high frequency signal from oscillator O is fed into the bridge by wires 63 and 64, respectively, as at the junction between lead 37 and wire 58 and the junction between lead 38 and wire 59. When probe 10 is moved within the transducer coils, as a result of the deflection of the balance beam, the inductance of one coil 27, 29 or 30, 32 increases as the other decreases, producing an unbalanced condition in the bridge circuit and a bridge output signal to appear at lead 39, i.e., between the common connection of the transducer coils and the slide wire of the bridge balance potentiometer 57. Different potentials will be present at these points, having a phase dependent on the direction of movement of probe 10 and its position with repsect to the previous null or zero point established by the bridge balance. The output from the bridge, when the probe is moved in one direction with respect to a null point, would be 180° out of phase with the output when probe 10 moves in the opposite direction.

The output signal from the bridge, when balance beam 46 is displaced to cause movement of probe 10 within the transducer coils, is amplified by amplifier A and energizes servo motor 62, which being connected to move the slide wire of potentiometer 57, repositions the slide wire to produce a change in the relative resistance of the resistance portions 55 and 56, to re-establish the balanced condition in the bridge. When the bridge is in balance condition, no output is supplied to amplifier A and servo motor 62 ceases to be energized. Servo motor 62 is also connected to a writing pen and indicator 65 of the recorder, in effect a recording oscillograph, and causes the pen to be moved across a paper chart 66, which may be moved lengthwise under the pen, such as a constant speed by rollers 67 powered by a conventional motor and gear train (not shown). As the chart is moved and the slide wire and pen are repositioned to produce a balanced condition, a trace 68 is made on the chart by the pen, indicating the amount of repositioning which took place during the time required for a predetermined length of chart to pass under the pen. Thus, each time probe 10 is moved by the deflection of balance beam 46, the slide wire is repositioned and the movement is recorded on chart 66 by pen 65. As will be evident, when the chart is moved, trace 68 will indicate the loss or gain in weight of the object. The weight change may also be observed through a scale associated with indicator 65, as disclosed in the aforesaid application Ser. No. 762,647. If the object being weighed is a liquid in a watch crystal, then the loss of weight, as by evaporation, will be indicated on the chart by trace 68. Or, a sample may be weighed periodically while undergoing an oxidation reaction or subjected to erosion, so that trace 68 will indicate gain or loss of weight at such time. Or, a sample may be heated to different temperatures and the result indicated by trace 68. Again, a series of samples may be weighed, with the chart moved to a different position for each sample, so that trace 68 will combine a permanent record of the weight of the samples. The latter is particularly advantageous in many instances, as for control purposes in a plant. When the object being weighed is being heated or undergoing corrosion, a conventional extension of a pan support may extend through the bottom or top of case 45 and into an insulated furnace, as for heating or oxidation, so that the balance will not be subjected to furnace temperatures.

A particular advantage of the transducer of this invention is to be found in its use with the automatic recording balance described above in connection with FIGS. 4 and 5. As indicated previously, with a conventional transducer having two coils of equal size and diameter, the linearity or linear range over which the probe could move without causing a variation greater than $1/10$ of 1% of the signal as compared with the actual movement of the probe, was about 0.040 inch. However, with the transducer of the present invention, the linearity was over 0.120 inch, i.e., over three times the linearity when using conventional transducer coils. The advantages of a transducer constructed in accordance with this invention, with its greatly increased linear range, will be apparent from the fact that, with such increased range, it is possible either to decrease the number of weights to be applied for a particular range of weight, or to read and indicate more accurately the precise weight of an article being weighed, or a change in weight thereof. The latter is, of course, more important in an analytical balance, since accuracy in weighing, such as to less than $1/10$ mg., is a sine qua non of an analytical balance.

That the results of using radially offset coil windings for each of the coils of the transducer are completely unexpected and unpredictable is evidenced from the fact that it was attempted to produce, without success, the same results by winding each coil in tapered fashion, i.e., on conical surfaces, with the greater diameter of the cones at the center and lesser diameter of the cones at the outer ends.

An an example of a transducer constructed in accordance with this invention, which was found to be desirable for use with the automatic recording balance described above, but not in limitation of the invention, each of the coil sections 27, 29, 30 and 32 was formed of enamel insulated #40 gauge copper wire, each coil section having 280 turns with approximately 40 turns per layer. The metal parts of the transducer, except probe 10, were formed of 18–8 stainless steel, while the outer diameter of the thinner cylindrical wall sections 14 and 15 was 0.175 in. and the outer diameter of the thicker cylindrical wall sections 16 and 17 was 0.220 in. Also, the distance between flanges 18 and 19, as well as between flanges 19 and the end flanges of spool 13, were each 0.170 in. The inside diameter of inner sleeve 12 was 0.125 in. Probe 10 was 0.070 in. in outer diameter, and 0.4375 in. long, with a 45° bevel at each end having a length of 0.010 in. in an axial direction. Probe 10 was formed of carbon steel.

Although a transducer constructed in accordance with this invention has been found to be particularly useful in an automatic recording balance, it will be evident that the transducer may be used in other types of apparatus, particularly whenever movement of one part relative to another is to be measured with a high degree of accuracy. Thus, other uses of the transducer of this invention will suggest themselves to those skilled in the art. Although a preferred embodiment of this invention has been illustrated and described, it will be evident that other embodiments may exist and that various changes may be made, without departing from the spirit and scope of this invention.

What is claimed is:

1. An inductance sensitive transducer comprising a pair of coils disposed in axial relation, each said coil including two radially offset sections with the sections adjacent the opposite coil having a greater inside and outside diameter than the sections remote from the opposite coil;

a probe disposed centrally within said coils, said probe and coils being mounted for relative axial movement between; and means for supplying a high frequency alternating current to said coils, through separate leads to the outer end of each coil and a common lead to the inner end of both coils.

2. An inductance sensitive transducer comprising a cylindrical spool having two axially adjacent portions of greater outer diameter at the center of said spool and portions of lesser outer diameter adjacent each end of said spool; a coil section disposed in the space outwardly of each of said portions of greater and lesser diameter, a coil section disposed outwardly of one portion of greater diameter being connected to a coil section disposed outwardly of the adjacent portion of lesser diameter to form one coil and the coil sections disposed outwardly of the remaining portions of greater and lesser diameter being connected together to form the other coil; and a probe disposed within said spool, said probe and spool being mounted for relative axial movement.

3. A transducer as defined in claim 2, including outwardly extending flanges separating the spaces disposed outwardly from adjacent portions of said spool.

4. A transducer as defined in claim 2, including an outer sleeve surrounding said spool, said spool having an end flange provided with a slot through which leads connected to the ends of said coils extend, said leads being of a larger size than the wire of said coils.

5. A transducer as defined in claim 4, including insulating material disposed in the space between said coils and said sleeve.

6. A transducer as defined in claim 5, wherein said end flange of said spool is provided with an additional slot for the introduction of such insulating material.

7. An inductance sensitive transducer, comprising an inner tubular sleeve; a cylindrical spool provided with axially spaced cylindrical portions of equal length, two inner portions of greater outer diameter being on each side of the longitudinal center of said spool and an outer portion of lesser outer diameter being adjacent each end of said spool, an outwardly extending flange separating each of the adjacent cylindrical portions of said spool, and a flange at each end of said spool having a greater diameter than said separating flanges, one said end flange having a pair of opposed axial slots; an outer sleeve enclosing said spool; a cap extending between said inner sleeve and outer sleeve at each end of said spool, one said cap having a pair of opposed axial slots in alignment with the slots in said one end flange of said spool; coil sections of substantially an equal number of turns wound about each of said cylindrical portions of said spool, each inner coil section being connected to the adjacent outer coil section to form one coil; two leads connected to the respective outer ends of said coils and one lead connected to both inner ends of said coil, said leads having a larger size than the wire which forms said coils and said leads extending through one pair of aligned slots in said spool end flange and said one cap; resinous insulation disposed in the space between said coils and said outer sleeve, said insulation permeating the turns of said coils and also surrounding said leads; and a probe disposed within said inner sleeve, said probe and spool being mounted for relative axial movement.

(References on following page)

References Cited by the Examiner
UNITED STATES PATENTS

| | | | |
|---|---|---|---|
| 1,671,106 | 5/1928 | Fisher | 336—136 X |
| 2,363,994 | 11/1944 | Richter | 336—136 X |
| 2,494,579 | 1/1950 | Pimlott | 336—136 X |
| 2,568,587 | 9/1951 | MacGeorge | 336—136 |
| 2,568,588 | 9/1951 | MacGeorge | 336—136 X |
| 2,631,027 | 3/1953 | Payne | 177—210 |
| 2,734,736 | 2/1956 | Payne | 177—210 |
| 2,740,941 | 4/1056 | Kelly | 336—30 |
| 2,875,419 | 2/1959 | Lear | 336—83 |
| 2,880,985 | 4/1959 | Roberts | 265—27 |
| 2,954,969 | 10/1960 | McCullough | 265—27 |
| 3,017,589 | 1/1962 | Chass | 336—30 X |

OTHER REFERENCES

Review of Scientific Instruments, December 1958 pp. 1135–1138.

JOHN F. BURNS, *Primary Examiner.*

I. LISANN, A. BERLIN, *Examiners.*